United States Patent [19]

Jackel

[11] Patent Number: 4,709,978

[45] Date of Patent: Dec. 1, 1987

[54] MACH-ZEHNDER INTEGRATED OPTICAL MODULATOR

[75] Inventor: Janet L. Jackel, Holmdel, N.J.

[73] Assignee: Bell Communications Research, Inc., Livingston, N.J.

[21] Appl. No.: 831,607

[22] Filed: Feb. 21, 1986

[51] Int. Cl.$^4$ ............................ G02B 6/10; G02F 1/00
[52] U.S. Cl. ................................. 350/96.14; 350/96.13
[58] Field of Search ............... 350/96.11, 96.12, 96.13, 350/96.14

[56] References Cited

U.S. PATENT DOCUMENTS 4,146,297  3/1979  Alferness et al. ................ 350/96.14

OTHER PUBLICATIONS

Gee et al., "Traveling-Wave Electrooptic Modulator", Applied Optics, vol. 22, No. 13; 1 Jul. 1983, pp. 2034–2037.
Leonberger, "High-Speed Operation of LiNbO$_3$ Electro-Optic Interfrometric Waveguide Modulators", Optics Letters, Jul. 1980, vol. 5, No. 7, pp. 312–314.
Osamu Mikami and Sakae Zembutsu, "Coupling-Length Adjustment for an Optical Directional Coupler as a 2×2 Switch", Appl. Phys. Lett., 35(1), Jul. 1, 1979, pp. 38–40.
Makoto Minakata, "Efficient LiNbO$_3$ Balanced Bridge Modulator/Switch with an Ion-Etched Slot", Appl. Phys. Lett., 35(1), Jul. 1, 1979, pp. 40–42.
Makoto Minakata, "Efficient LiNbO$_3$ Balanced Bridge Modulator/Switch with an Ion-Etched Slot", Appl. Phys. Lett., 35(1), Jul. 1, 1979.
Osamu Mikami and Sakae Zembutsu, "Modified Balanced-Bridge Switch with Two Straight Waveguides", Appl. Phys. Lett., 35(2), Jul. 15, 1979, pp. 145–147.

Primary Examiner—John Lee
Assistant Examiner—John Ngo
Attorney, Agent, or Firm—James W. Falk; Stephen M. Gurey

[57] ABSTRACT

A Mach-Zehnder interferometric modulator includes on a Z-cut crystal substrate of LiNbO$_3$ an input waveguide section (302), an input branching section (303) for dividing an optical signal on the input waveguide into two substantially equal portions, first and second branch waveguides (304, 305) each having an electrode associated therewith (309, 308), an output branching section (306) for recombining the light from each branch waveguide into a single optical signal on an output waveguide section (307). The two branch waveguides are spaced close enough to maximize the field overlap between the applied electrical field and the optical field in the waveguides but are optically decoupled to prevent cross-coupling of light between the branches. This decoupling is achieved by using structures which change the propagation constant of one of the branches with respect to the other along the modulation length.

9 Claims, 5 Drawing Figures

MACH-ZEHNDER INTEGRATED OPTICAL MODULATOR

BACKGROUND OF THE INVENTION

This invention relates to integrated optical components, and in particular to components for modulating a light signal with an electrical information signal for transmission over optical fiber facilities.

The guided-wave Mach-Zehnder interferometric modulator is a well-known optical device which has been extensively discussed in the literature in such articles as "Multigigahertz-Lumped-Element Electrooptic Modulator," by Richard A. Becker, *IEEE Journal of Quantum Electronics*, Vol. QE-21, No. 8, Aug. 1985, pp. 1144-1146 and "Guided-Wave Devices for Optical Communication," by Rod C. Alferness, *IEEE Journal of Quantum Electronics*, Vol. QE-17, No. 6, June 1981, pp. 946-959. The interferometric modulator consists of a single input waveguide, an input branching region for splitting the input light power into two substantially equal portions, two branch waveguides, an output branching region for recombining the propagating light power in the two branch waveguides, and an output waveguide. By effecting a phase shift in one branch waveguide relative to the other, the combined output light power is between zero and the input power level, depending upon the magnitude of the phase shift. Such phase shifts are effected by means of electrodes disposed on the substrate of the optical waveguide proximate to one or both of the branch waveguides. When a voltage is applied, the electrooptic effect changes the refractive index of the proximate branch waveguide changing the optical path length, thereby effecting a phase change in the branch. By keeping the branch waveguides sufficiently apart to prevent optical coupling between the branches which would degrade performance, voltage variations are linearly transformed into the phase changes and thus into amplitude variations in the light output power level. Accordingly, by modulating the electrode voltage with an analog or digital information signal, the output light power is similarly modulated and can be coupled onto a fiber waveguide for transmission.

In the prior art interferometric modulators, either a two or a three traveling wave electrode configuration is employed. In the two-electrode configuration, the electrodes are disposed along one branch waveguide length. Advantageously, the electrodes can be impedance matched to their driving circuits by selecting the electrode widths as a function of the gap between electrodes. By impedance matching the electrodes, no power is lost to reflections. Disadvantageously, however, the available power effects a phase shift in only the one associate branch waveguide thereby limiting the depth of achievable modulation for a given voltage.

In the three-electrode configuration one electrode is commonly disposed between the two branch waveguides and separate grounded electrodes are disposed along each branch waveguide. A voltage between the common electrode and each ground electrode effects an equal and opposite phase shift in each branch waveguide thereby achieving twice the net phase shift than the two-electrode configuration for the same voltage. This plus-minus phase shifting arrangement is known as push-pull and is advantageous for its efficient voltage utilization in that for a given voltage, twice the net phase shift is effected than in the aforenoted two-electrode configuration. Disadvantageously, however, because of the need to keep the branch waveguides far apart to prevent optical coupling, the three-electrode configuration cannot be impedance matched to the driving circuits, thereby resulting in microwave reflections and losses and thus not fully efficient use of the available power.

For high speed operation neither configuration is voltage efficient. Whereas push-pull operation is achievable in the three-electrode configuration, microwave losses due to impedance mismatch are most deleterious at high speeds, thereby negating the push-pull advantage. The two-electrode configuration, although not exhibiting microwave losses, has precluded push-pull operation and requires more power to effect the same modulation depth, which at high speeds, driving circuits are unable to deliver. Accordingly, prior art interferometric modulators can not be optimized for both the switching voltage and microwave coupling.

SUMMARY OF THE INVENTION

Both microwave coupling and switching voltage are optimized in the interferometric modulator of the present invention. The interferometric modulator includes two branch waveguides each having an electrode disposed proximate to and associated therewith. The branch waveguides and their associated electrodes are disposed close enough to each other to maximize the field overlap between the applied electrical field and the optical field in the waveguide so as to induce a positive phase shift in one branch waveguide and an equal and opposite phase shift in the other waveguide. In order to minimize coupling of light energy back and forth between the two proximate branch waveguides, however, that would degrade performance, the branch waveguides are optically decoupled by changing the propagation constant of one branch waveguide with respect to the other. This optical decoupling is realized by one of several ways including making the width of one branch along the modulation length greater than the width of the other branch waveguide. Advantageously, the two stripline electrodes can be impedance matched to the microwave driving circuits thereby eliminating power reflections and the losses associated therewith.

DETAILED DESCRIPTION

Figure 1:
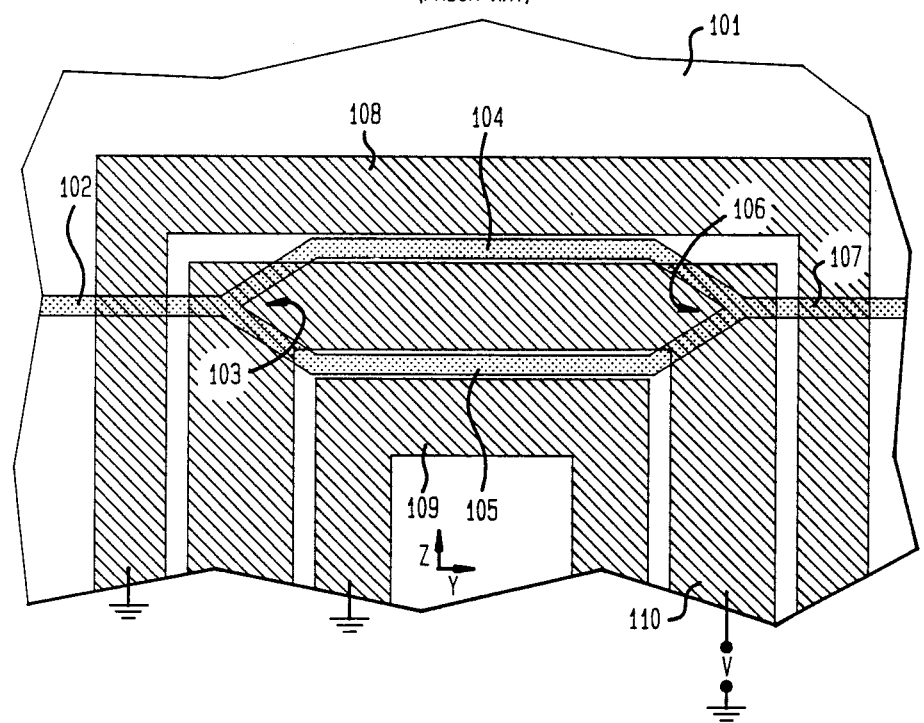
FIG. 1 shows a prior art three-electrode interferometric modulator configuration.

With reference to FIG. 1, a prior art three-electrode guided-wave electrooptic Mach-Zehnder interferometric modulator driven in a push-pull configuration is shown. This modulator is similar to a modulator shown in FIG. 1 in the aforenoted Becker article. The modulator includes an X-cut anisotropic crystal substrate 101 such as $LiNbO_3$ which an optical waveguide path is formed through one of several well-known methods such as ion implantation, Li out-diffusion, metal in-diffusion, and ion exchange. In particular, in-diffusion of a transition metal, for example Ti is frequently used.

The modulator includes an input waveguide 102, and input branching region 103 for dividing the input light power from waveguide 102 into two ideally equal portions, branch waveguides 104 and 105, an output branching region 106 for recombining the light from each branch arm 104 and 105 into a single optical signal on output waveguide section 107. Branch waveguides 104 and 105 are separated sufficiently to prevent optical cross-coupling therebetween. A grounded traveling wave electrode 108 is disposed in close proximity to branch 104 on the surface of substrate 101, separated therefrom by a buffer layer of a material such as $SiO_2$. A second grounded traveling wave electrode 109 is similarly disposed in close proximity to branch 105 on substrate 101. A third traveling wave electrode 110 is disposed between and proximate to both branch waveguides 104 and 105.

When a positive voltage V is applied to electrode 110, the electric field in the positive Z-direction between electrodes 110 and 108 along the modulation length induces a phase shift in waveguide branch 104 while the equal and opposite electric field in the negative Z-direction between electrodes 110 and 109 along the modulation length induces an equal and opposite phase shift in branch waveguide 105. In this push-pull arrangement the magnitude of the combined light output in output guide 107 is affected by the equal and opposite phase shifts induced in both branch waveguides 104 and 105 by the voltage V. When the voltage V is an analog or digital information signal, the amplitude of the optical signal on waveguide 107 is similarly modulated.

Advantageously by effecting a phase shift in both branch waveguides 104 and 105, the available driving voltage V achieves twice the modulation depth achievable if that same voltage were to effect a phase change in only one branch. Disadvantageously, due to the geometry of the configuration, the characteristic impedance of electrodes 108, 109 and 110 cannot be optimized to be impedance matched to the driving circuits. The resultant losses caused by microwave reflections which are most deleterious at high signal speeds, therefore, require a higher voltage V to achieve the same modulation depth, thereby negating in part the advantage of a push-pull configuration.

Figure 2:
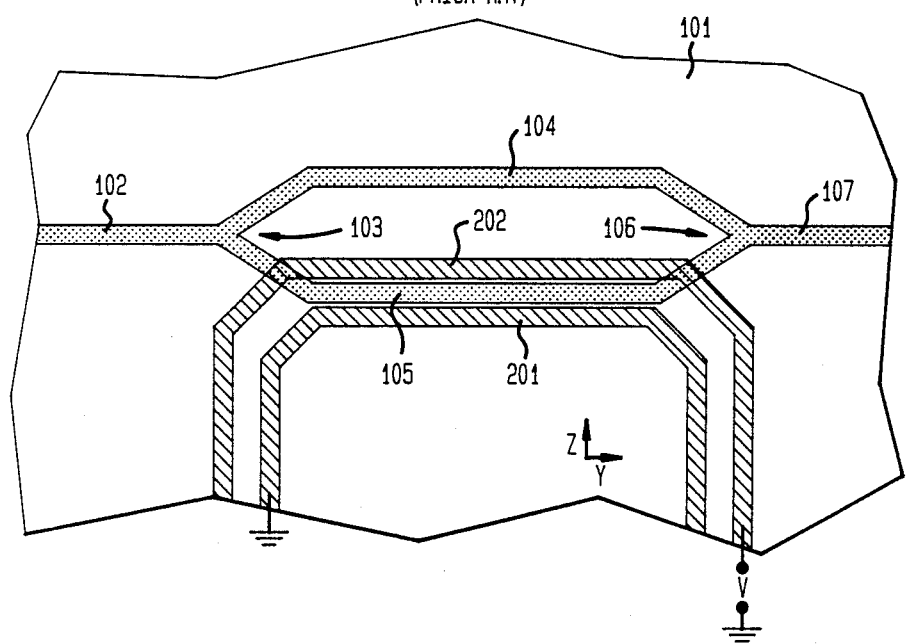
FIG. 2 shows a prior art two-electrode interferometric modulator configuration.

With reference to FIG. 2, a prior art two-electrode Mach-Zehnder interferometric modulator is shown. Similar numeric designations are given for elements corresponding to elements in FIG. 1. This modulator is similar to the modulator shown in FIG. 8 of the aforenoted Alferness article. In this two-electrode configuration a first grounded traveling wave electrode 201 is disposed on substrate 101 along one branch waveguide 105 of the structure while a second traveling wave electrode 202 is disposed on substrate 101 on the opposite side of the same branch waveguide 105. When a voltage V is impressed across electrodes 202 and 201, the electric field therebetween along the modulation length, as a result of the electrooptic effect, induces a phase shift in the light signal in branch waveguide 105. When this signal is recombined in branch section 106 with the unshifted signal in waveguide section 104, the resultant output signal has a magnitude less than or equal to the input signal, depending upon the magnitude of the induced phase shift. As aforenoted, since the light in only one waveguide branch is phase shifted, the voltage required to effect the same modulation depth as the push-pull arrangement is twice as large. Advantageously, however, using well-known microwave techniques, electrodes 201 and 202 can be designed, by appropriate geometric selections of the widths and gaps between the electrodes, to be impedance matched to the driving circuits, thereby eliminating power losses due to reflections.

For high speed operation where the driving voltage is limited and where power losses due to reflections from impedance mismatch are most deleterious, neither of these prior art configurations provides optimum performance.

Figure 3:
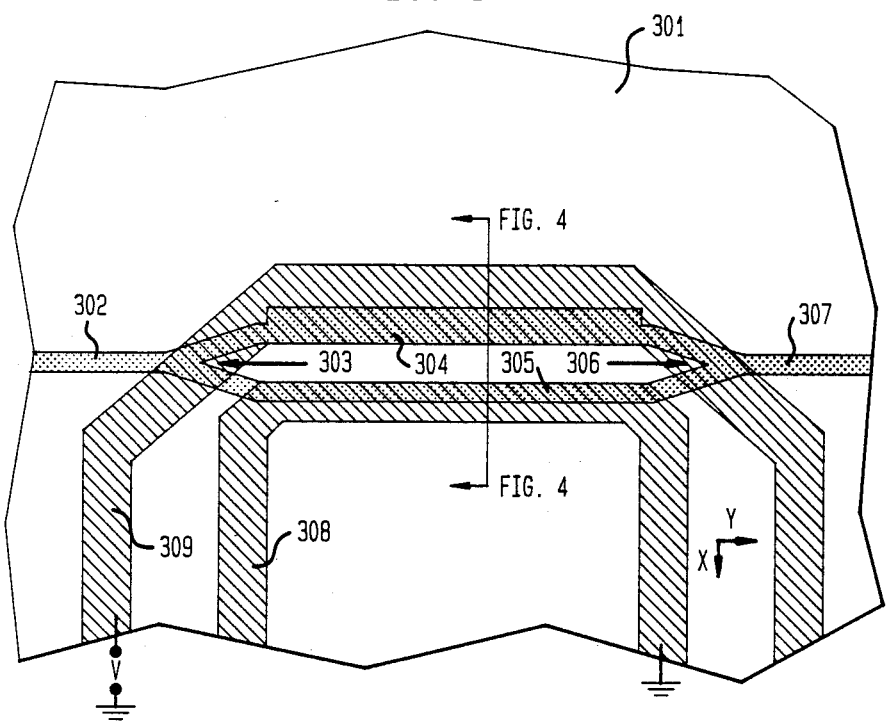
FIG. 3 shows an interferometric modulator incorporating the present invention.

With reference to FIG. 3, an embodiment of the Mach-Zehnder interferometric modulator of the present invention is shown. The modulator includes a Z-cut crystal substrate 301 of a material such as $LiNbO_3$. The waveguide sections, configured like the waveguide sections in FIGS. 1 and 2, include an input waveguide section 302, a branching region 303, branch waveguides 304 and 305, an output branching region 306, and an output waveguide section 307. A first traveling wave grounded electrode 308 is disposed over branch waveguide 305, and a second traveling wave electrode 309 is disposed over branch waveguide 304, both electrodes being separated from the substrate 301 and the associated branch waveguides by a buffer layer.

In order to operate as a push-pull device, branch waveguides 304 and 305 are disposed proximate enough to each other to maximize the field overlap between the applied electrical fields and the optical field in the branch waveguides 304 and 305 along the modulation length while being simultaneously optically decoupled. Such optical decoupling between branch waveguides 304 and 305 prevents cross-coupling of light between the branch waveguides that otherwise degrades the modulation characteristics of the modulator and in particular substantially reduces the modulation depth.

Such optical decoupling of the branch waveguides is achieved by changing the propagation constant of one branch waveguide with respect to the other, which thereby permits close physical proximity of the two branch waveguides required for maximum field overlap. Such optical decoupling is achievable in several ways. A particularly easy to fabricate method is to make one branch waveguide 304 wider than branch waveguide 305, as shown in FIG. 3, which creates a different propagation constant in each branch waveguide. This is readily fabricated by using a mask of a different width when forming the waveguides using techniques such as Ti in-diffusion.

Figure 4:
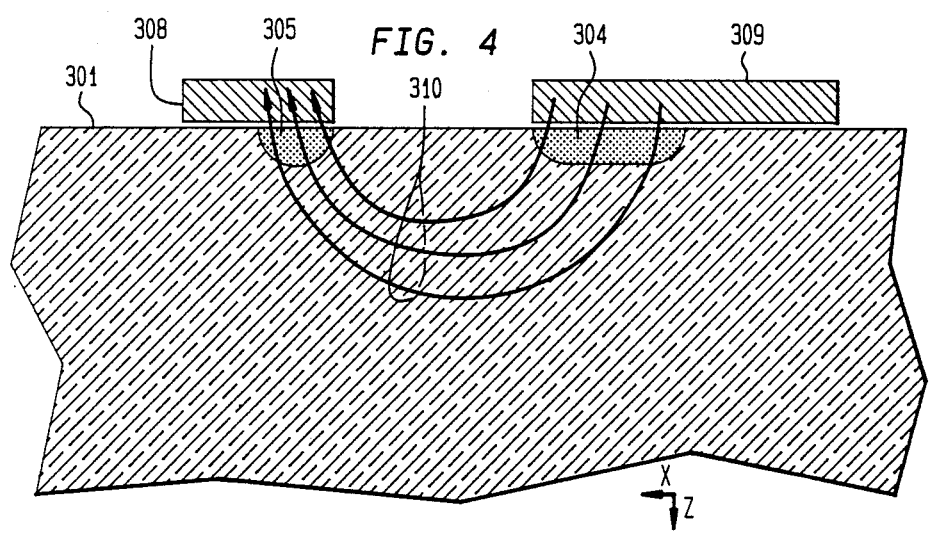
FIG. 4 shows a cross-sectional view of the branch waveguide sections of FIG. 3.

As noted in the cross-sectional view of FIG. 4, the electric field lines 310 between electrodes 309 and 308 are oriented in through the crystal substrate 301 and through branch waveguide 304 in the positive Z-direction and through branch waveguide 305 in the negative Z-direction. Therefore, the electrooptic effect induces the desired equal and opposite phase change in each branch waveguide from the applied voltage V. Advantageously, this two-electrode push-pull modulator can be impedance matched to the external driving circuits using standard microline techniques.

Other techniques for optically decoupling the branch waveguides by changing the propagation constant of one branch waveguide with respect to the other are also possible. These include changing the index of one branch waveguide with respect to the other by doping one branch waveguide more heavily than the other in the fabrication process, loading one of the branch waveguides with a high index overlay, etching away part of one waveguide, or making one waveguide deeper than the other. As noted, the embodiment of FIG. 3 is advantageous due to its ease of implementation.

Figure 5:
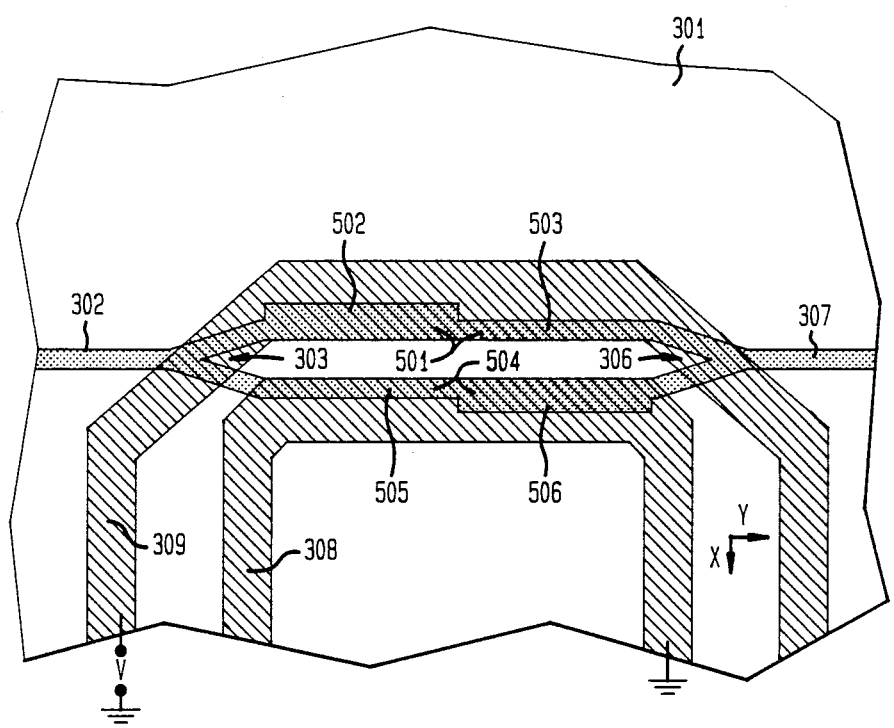
FIG. 5 shows another embodiment of the present invention.

An alternate embodiment is shown in FIG. 5. Rather than employing a branch waveguide of uniform width along the modulation length, branch waveguide 501 is divided in half into wide width and a narrow width sections 502 and 503, respectively and branch waveguide 504 is divided in half, in opposite orientation thereto, into narrow width and a wide width sections 505 and 506, respectively. The branch waveguides 501 and 504 remain optically decoupled. The slight bias in the output signal that would result for a zero volt input in the modulator of FIG. 3 is eliminated by making the net propagation delay through branch waveguides 501 and 504 equal.

Although the embodiment of the present invention is FIGS. 3 and 5 have been described using a Z-cut LiNbO$_3$ crystal substrate, in other crystal substrates having different symmetries a different crystal orientation may be more advantageous.

The above described embodiment is illustrative of the principles of the present invention. Other embodiments may be devised by those skilled in the art without departing from the spirit and scope of the invention.

What is claimed is:

1. An optical interferometric modulator comprising an input waveguide section
   an input branching section for dividing an optical signal on said input section into two substantially equal portions,
   first and second branch waveguides for transmitting the two portions of the divided optical signal,
   first and second electrodes each associated with said first and second branch waveguides, respectively, and each in a proximate physical relationship with its associated branch waveguide along a modulation length,
   an output branching section for combining the optical signals on said first and second branch waveguides, characterized in that
   said first and second branch waveguides are disposed in such a proximate physical relationship with each other along the modulation length to maximize the field overlap between the electric fields from said first and second electrodes and the optical field in the branch waveguides, and
   said modulator further comprises means for optically decoupling said first and second branch waveguides.

2. An optical modulator in accordance with claim 1 wherein said means for optically decoupling said first and second branch waveguides comprises means for changing the propagation constant of one branch waveguide with respect to the other branch waveguide.

3. An optical modulator in accordance with claim 2 wherein said means for changing the propagation constant of one branch waveguide with respect to the other comprises said first branch waveguide having a width different than the width of said second branch waveguide along the modulation length.

4. An optical modulator in accordance with claim 3 wherein said first branch waveguide has a first width along a first portion and a second width along a second portion of the modulation length, and said second branch waveguide has said second width along a first portion and said first width along a second portion of the modulation length.

5. An optical modulator in accordance with claim 4 wherein the first and second portions of the first branch waveguide along the modulation length are substantially equal to each other and the first and second portions of the second branch waveguide along the modulation length are substantially equal to each other.

6. An optical modulator in accordance with claim 2 wherein said means for changing the propagation constant of one branch waveguide with respect to the other comprises said first branch waveguide being more heavily doped than said second branch waveguide along the modulation length.

7. An optical modulator in accordance with claim 2 wherein said means for changing the propagation constant of one branch waveguide with respect to the other comprises a high index overlay loaded on one of said branch waveguides along the modulation length.

8. An optical modulator in accordance with claim 2 wherein said means for changing the propagation constant of one branch waveguide with respect to the other comprises one branch waveguide having a depth different than the depth of said second branch waveguide along the modulation length.

9. An optical modulator in accordance with claim 2 wherein said means for changing the propagation constant of one branch waveguide comprises one branch waveguide being etched away along the modulation length.

* * * * *

UNITED STATES PATENT AND TRADEMARK OFFICE
CERTIFICATE OF CORRECTION

PATENT NO. : 4,709,978

DATED : December 1, 1987

INVENTOR(S) : Janet Lehr Jackel

It is certified that error appears in the above-identified patent and that said Letters Patent is hereby corrected as shown below:

Column 2, line 66, "$LiNbO_3$ which" should read --$LiNbO_3$ through which--.

Signed and Sealed this

First Day of November, 1988

Attest:

DONALD J. QUIGG

*Attesting Officer*  *Commissioner of Patents and Trademarks*